(12) United States Patent
Wu et al.

(10) Patent No.: US 12,487,974 B2
(45) Date of Patent: Dec. 2, 2025

(54) VIRTUAL COMPUTING INSTANCE BASED SYSTEM TO SUPPORT UNION MOUNT ON A PLATFORM

(71) Applicant: Omnissa, LLC, Mountain View, CA (US)

(72) Inventors: Junfei Wu, Beijing (CN); Xiaodong Ye, Beijing (CN); Haiwei Zhao, Beijing (CN); Chen Liu, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 833 days.

(21) Appl. No.: 17/168,484

(22) Filed: Feb. 5, 2021

(65) Prior Publication Data

US 2022/0222223 A1 Jul. 14, 2022

(30) Foreign Application Priority Data

Jan. 12, 2021 (WO) ................ PCT/CN2021/071179

(51) Int. Cl.
*G06F 16/188* (2019.01)
*G06F 9/455* (2018.01)
*G06F 16/176* (2019.01)

(52) U.S. Cl.
CPC ........ *G06F 16/192* (2019.01); *G06F 9/45558* (2013.01); *G06F 16/176* (2019.01); *G06F 2009/45575* (2013.01)

(58) Field of Classification Search
None
See application file for complete search history.

(56) References Cited

U.S. PATENT DOCUMENTS

| | | | |
|---|---|---|---|
| 11,010,355 B2* | 5/2021 | Ye | G06F 16/00 |
| 2011/0040812 A1 | 2/2011 | Phillips | |
| 2016/0359955 A1 | 12/2016 | Gill et al. | |
| 2017/0264684 A1 | 9/2017 | Spillane et al. | |
| 2018/0157860 A1* | 6/2018 | Nair | G06F 21/6218 |
| 2020/0409921 A1* | 12/2020 | Starks | G06F 9/44557 |
| 2021/0042141 A1 | 2/2021 | De Marco et al. | |
| 2021/0103450 A1 | 4/2021 | Prasad et al. | |
| 2021/0240671 A1 | 8/2021 | Fong et al. | |
| 2022/0012079 A1 | 1/2022 | Wu et al. | |
| 2022/0197689 A1 | 6/2022 | Hotinger et al. | |

FOREIGN PATENT DOCUMENTS

EP 3304295 A1 1/2021

* cited by examiner

*Primary Examiner* — Bradley A Teets
*Assistant Examiner* — Melissa A Headly
(74) *Attorney, Agent, or Firm* — Kim & Stewart LLP (57) ABSTRACT

Described herein are a system and method for combining folders in a host operating system lacking a facility for performing the combining. A helper virtual machine (VM) is formed and runs a guest operating system with a facility for combining folders such as a union mount facility. The host operating system also runs a host/guest file-sharing server to share folders instead of copying them. The file-sharing server allows the VM to access host folders, perform the combination using the union mount facility, and then allows the host operating system to access the results as a shared union mount folder in the host. Any changes to the shared union mount folder in the host are automatically processed by the union mount facility in the VM and then reflected to a folder in the host operating system.

12 Claims, 9 Drawing Sheets

VIRTUAL COMPUTING INSTANCE BASED SYSTEM TO SUPPORT UNION MOUNT ON A PLATFORM

CROSS-REFERENCE TO RELATED APPLICATION(S)

This application claims benefit of and priority to International Application No. PCT/CN2021/071179, filed Jan. 12, 2021, which is hereby assigned to the assignee hereof and hereby expressly incorporated by reference herein in its entirety as if fully set forth below and for all applicable purposes.

BACKGROUND

An operating system with a facility for combining multiple folders (also referred to as directories) into one folder that appears to contain their combined contents is important for many applications. Such a facility may be referred to, for example, as a union mount. In one example, a read-only folder and a writeable folder may be combined by union mounting the folders to be presented as a new folder. Accordingly, any write or update operations executed on the new folder to data that is stored in the read-only folder may cause the new/updated data to be stored in the writeable folder, thereby maintaining the data in the read-only folder while also keeping track of changes or the delta data in the writeable folder. Further, any read operations to the new folder return the most up to date data (whether from the read-only folder or the writeable folder).

Combining folders is an operation often performed to create a root file system for a container, which is a virtualization of an operating system in which a portion of the resources over which the operating system has control, such as namespaces, control groups, and files systems, are formed into an isolated environment in which an image of an application program is run. In the combining operation, a base folder of the container image and one or more other folders are combined to make the root file system. The base folder and the one or more other folders are layers in the container image and have a specific ordering, where the base layer is the starting layer, and subsequent layers, which are difference layers, are added to the base layer according to the specific ordering such that upper layers may overwrite lower layers.

The container image is commonly extracted from a tar file, and each layer of the image is stored in a hash-named directory so that it is content addressable. An index contains a manifest that points to the hash-named directories for each layer, and the manifest contains a configuration field that refers to the set of layers needed to build the container image.

Under the control of a container runtime, which manages the container and may run natively on a host operating system of a host computer system, the container image, once formed, is processed to form an executable image that is executed in the container.

A container image resides in a repository and is obtained by pulling it from the repository. Changes to the container image based on the execution of the container may be pushed back to the repository for later execution. A typical workflow executed by the container runtime includes: 1) pulling from the repository the container image, extracting the one or more directories from the container image and extracting a layer from each directory; 2) storing the layers in separate folders (e.g., where each layer is a difference layer over the previous layer, and each layer has its own folder); and 3) combining the folders for each layer to get a combined folder, which can be added to the root file system of the container for access by the container.

As discussed, the container runtime can run natively on the host operating system. Therefore, in order to support the typical workflow of the container runtime, the host operating system needs to support a combining operation to combine the folders of the layers of the container image. However, some operating systems do not support an operation for combining the layers of the image. One such operating system is the MAC operating system (MAC OS).

An operating system without a combining operation, such as a union mount facility, uses less efficient mechanisms to form the needed combination of folders. In such an operating system, folders may be duplicated, with duplicated and redundant folders taking up a large amount of disk space. What is needed is a way to combine folders without duplicating folders and without creating large redundant folders, regardless of whether the operating system offers a union mount facility.

SUMMARY

One embodiment provides a method of performing a union mount of a plurality of folders. The method includes running a virtual machine on a hypervisor executing on a host operating system of a computing device, sharing a first folder and a second folder from the host operating system with a shared first folder and a shared second folder in a guest operating system of the virtual machine, performing in the guest operating system of the virtual machine a union mount of the shared first folder and the shared second folder to form a union mount folder, and sharing the union mount folder with a shared union mount folder in the host operating system.

Further embodiments include a computer-readable medium containing instructions that, when executed by a computing device, cause the computing device to carry out one more aspects of the above method, and a system comprising a memory and a processor configured to carry out one or more aspects of the above method.

DETAILED DESCRIPTION

Embodiments described herein provide systems and methods for providing a union mount facility on a platform, such as a host operating system running on a computing device, that does not support a union mount. In some embodiments, as described below, a helper virtual machine (VM) is provided that runs an operating system, such as Linux™, that has a facility for combining folders, such as a union mount facility. The helper VM is executed on a host operating system that does not support a union mount. Such a helper VM is used to provide a union mount facility to the host operating system, as further discussed herein.

In some embodiments, a plurality of host folders to be union mounted is made available, without copying, to the helper VM by running on the host operating system a host/guest file sharing server (e.g., as provided by the host operating system or separate from the host operating system of the host computer system). The file-sharing server gives the helper VM access to the host folders as shared folders in the helper VM as if the folders were present in the helper VM. In this case, the host operating system runs on a server, and the helper VM is a client to the server. In addition, folders that reside in the helper VM are made available, without copying, to the host operating system by another file-sharing server. In this case, the helper VM runs the other file-sharing server, and the host operating system is a client to the other file-sharing server. Therefore, I/O operations performed on the shared folders in the helper VM are reflected by the other file-sharing server from the helper VM to the host folders on the host operating system, so that it appears that the I/O operations of the helper VM are performed on the host folders on the host operating system. Thus, in certain embodiments, the host operating system runs a first file-sharing server and the helper VM runs a first file-sharing client, while the helper VM runs a second file-sharing server and the host operating system runs a second file-sharing client.

Accordingly, in certain embodiments, the host operating system is configured to share, using the first file-sharing server, a plurality of folders (e.g., a first folder and a second folder) to be union mounted with the helper VM as a plurality of shared folders (e.g., a first shared folder and a second shared folder). Further, the helper VM is configured to union mount the plurality of shared folders in the helper VM as a union mounted folder in the helper VM. The helper VM, via the second file-sharing server (e.g., as provided by the guest operating system and the host operating system, such as a Samba server, or separate from the operating systems) is configured to share the union mounted folder with the host operating system as a shared union mounted folder in the host operating system.

Accordingly, the shared union mounted folder in the host operating system has the appearance of a union mounted folder for the plurality of folders to be union mounted in the host operating system, thereby appearing to provide a union mount facility for an operating system that does not support a union mount facility. In particular, any I/O, including changes, to the shared union mounted folder in the host operating system is provided to the union mounted folder in the helper VM. Based on that, the I/O is performed on the plurality of shared folders based on the union mounting. Any changes are then accordingly provided to the writeable shared folder (e.g., shared second folder) on the helper VM based on the union mounting. The I/O performed on the plurality of shared folders is passed back to the plurality of folders to be union mounted in the host operating system. Any changes are then accordingly provided to the corresponding folder (e.g., second folder) in the host operating system. Thus, write operations to the shared union mount folder are reflected in the second folder and not a first folder, which may be read-only. From a user's point of view, the shared union mounted folder operates as if a native union mount in the host operating system were available without requiring the copying of folders, which advantageously saves storage resources of the host operating system.

Certain embodiments herein may be described for providing a union mount facility for forming a root file system for a container. However, the techniques discussed herein may be used for any suitable application and are not limited to such a use case.

Figure 1:
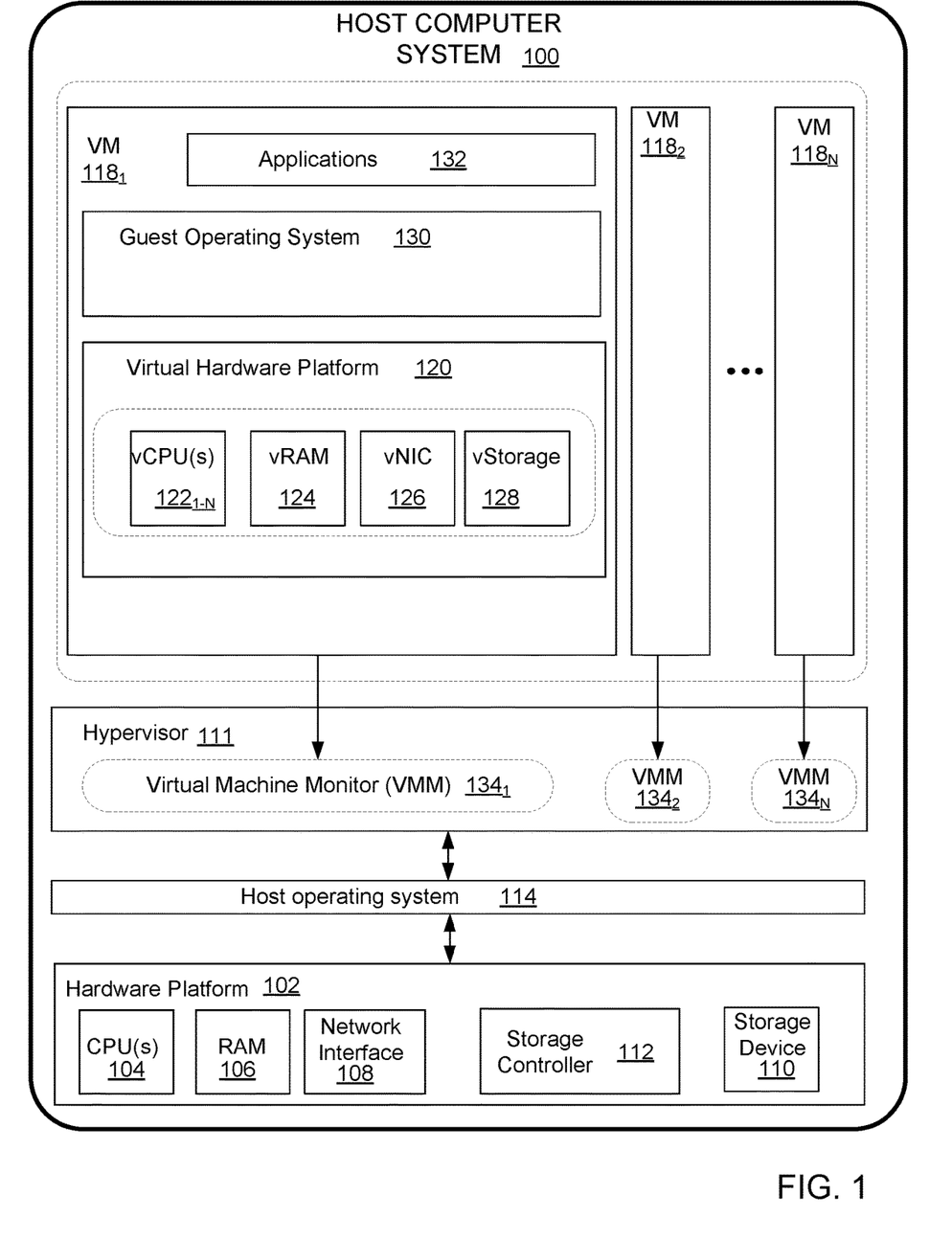
FIG. 1 depicts a block diagram of a computer system that is representative of a virtualized computer architecture, according to embodiments.

FIG. 1 depicts a block diagram of a host computer system 100 that is representative of a virtualized computer architecture. As is illustrated, host computer system 100 supports multiple virtual machines (VMs) $118_1$-$118_N$, which are an example of virtual computing instances that run on and share a common hardware platform 102. Hardware platform 102 includes conventional computer hardware components, such as random access memory (RAM) 106, one or more network interfaces 108, storage controller 112, persistent storage device 110, and one or more central processing units (CPUs) 104. Central processing units 104 may include processing units having multiple cores.

A virtualization software layer, hereinafter referred to as a hypervisor 111, is installed on top of a host operating system 114, which itself runs on hardware platform 102. Hypervisor 111 makes possible the concurrent instantiation and execution of one or more virtual computing instances such as VMs $118_1$-$118_N$. The interaction of a VM 118 with hypervisor 111 is facilitated by the virtual machine monitors (VMMs) $134_1$-$134_N$. Each VMM $134_1$-$134_N$ is assigned to and monitors a corresponding VM $118_1$-$118_N$. In such an embodiment, hypervisor 111 operates above an abstraction level provided by the host operating system 114. In certain embodiments, host operating system 114 is an operating system without a union mount facility, such as MAC OS.

After instantiation, each VM $118_1$-$118_N$ encapsulates a virtual hardware platform 120 that is executed under the control of hypervisor 111. Virtual hardware platform 120 of VM $118_1$, for example, includes but is not limited to such virtual devices as one or more virtual CPUs (vCPUs) $122_1$-$122_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of guest OS 130 include any of the well-known operating systems, such as the Microsoft Windows™ operating system, the Linux™ operating system, MAC OS, and the like. In certain embodiments, the guest OS 130 is an operating system with a union mount facility, such as Linux™.

Figure 2:
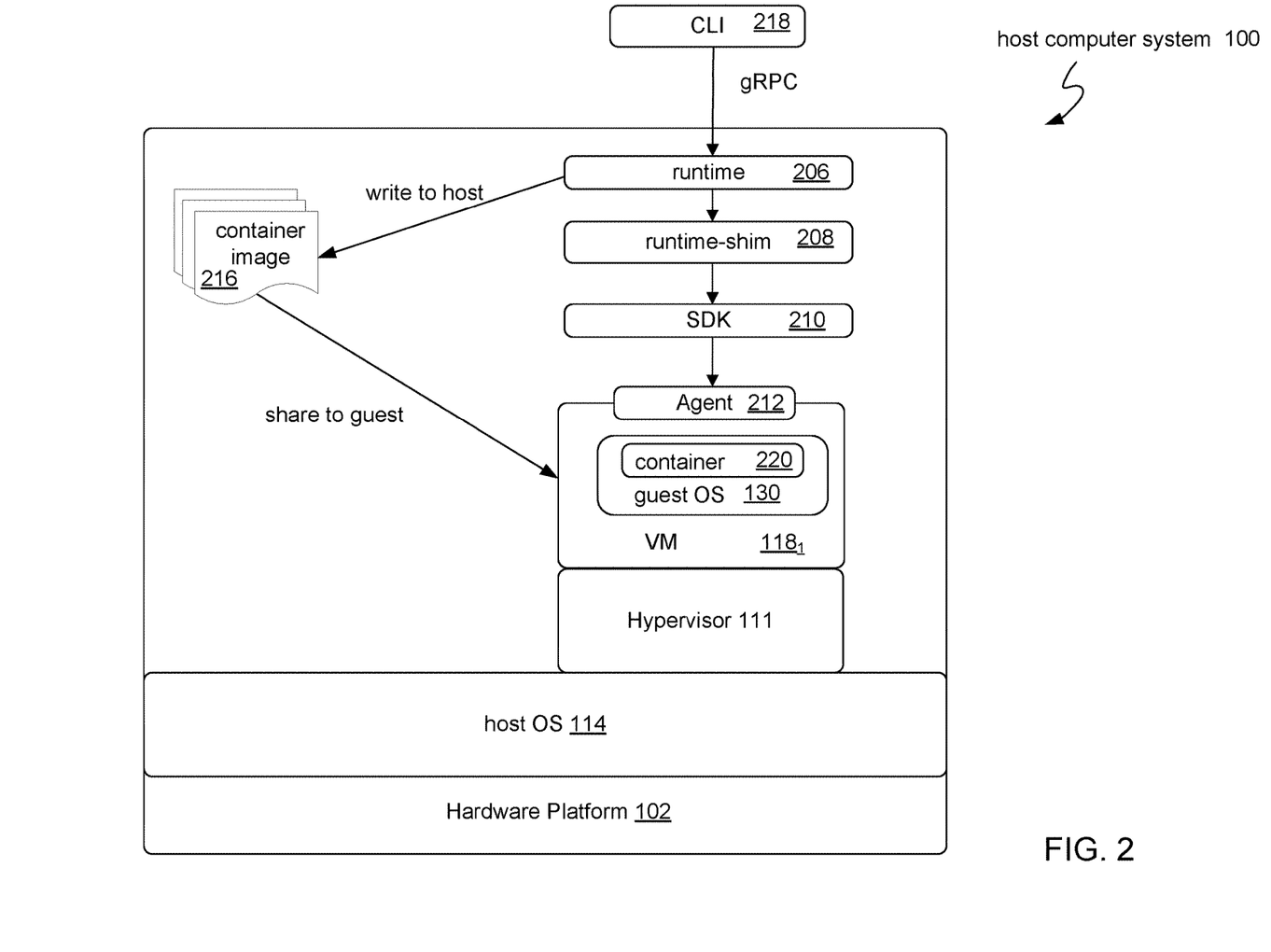
FIG. 2 depicts in more detail the host computer system, one of the virtual machines, and various folders, according to embodiments.

FIG. 2 depicts a configuration for running a container in a virtual machine $118_1$ that runs on a host computer system 100, in an embodiment. In the configuration depicted, the host computer system 100 includes hardware platform 102 and hypervisor 111, which runs a virtual machine $118_1$, which runs a guest operating system 130, such as the Linux operating system. The virtual machine $118_1$ has an interface agent 212 that is coupled to a software development kit (SDK) 210, which in turn, is coupled to a container runtime-shim 208. A container runtime 206, running on the host operating system 114 is coupled between the container runtime-shim 208 and a command-line interface (CLI) 218 via a remote procedure call (RPC). In one embodiment, the virtual machine $118_1$ is a light-weight VM that is customized to run containers.

SDK 210 is a wrapper for the VM $118_1$ and provides language support for interacting with the VM $118_1$.

Container runtime-shim 208 is a process that becomes a parent process for container 220 when container 220 is created.

Container runtime 206 is the process that manages the life cycle of container 220. In particular, container runtime 206 fetches a container image 216 when requested by the CLI 218. In some embodiments, container runtime 206 is a Docker® containerd.

The RPC, such as gRPC, performs two-way authentication of the CLI 218 and the container runtime 206 and encodes data transferred between container runtime 206 and CLI 218.

In certain embodiments, to standardize the storing of images (e.g., container images), the Open Container Initiative (OCI) sets out an image specification. The image specification describes an archive format of container images, which are unpacked to create a bundle meeting a runtime specification, also specified by the OCI. In certain embodiments, a container image includes a directory of hash-named directories (corresponding to layers), an index, and a layout. OCI also sets out the requirements for creating a runtime bundle (corresponding to an executable image), which is formed from the hash-named directories and configuration information and is the item actually run by the container.

Figures 3A, 3B:
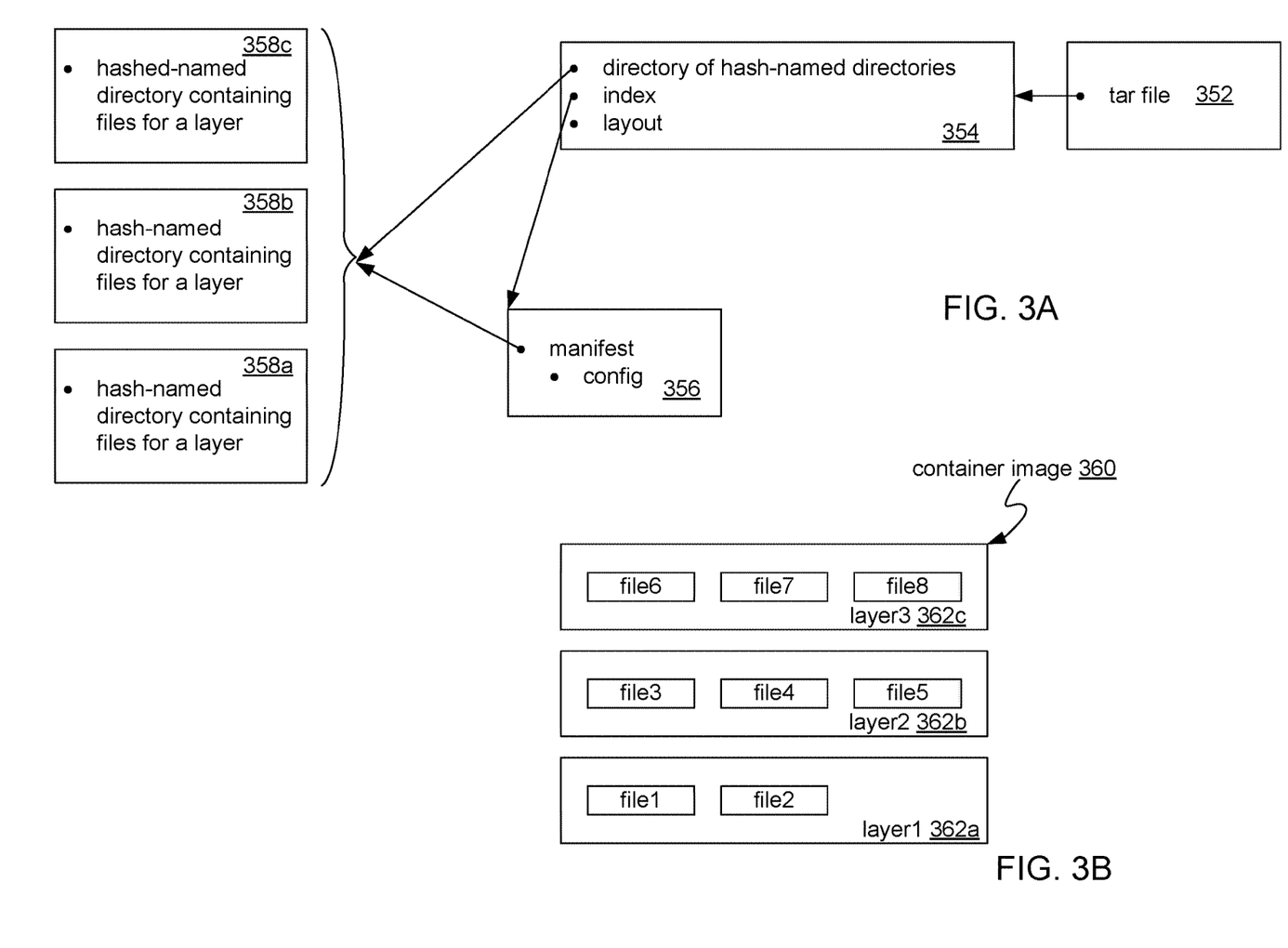
FIG. 3A depicts the structure of a container image in a repository, according to embodiments.
FIG. 3B depicts the structure of a container image, according to embodiments.

FIG. 3A depicts the structure of a container image in a repository. As shown, a delivery file, such as tar file 352, contains a structure 354 that includes a directory of hash-named directories, an index, and a layout. Each hash-named directory 358a-c contains files, sometimes called image digest files, for a particular layer of the image. Accordingly, an image digest file corresponds to a layer of the container image. The hash-named directories 358a-c permit content-addressable access to the files of the layers. The index in structure 354 contains at least one manifest 356, which points to the hash-named directories 358a-c containing the files of the layers and configuration information labeled config, which is used to create the runtime bundle.

FIG. 3B depicts the structure of a container image. As shown, a container image 360 is the combination of read-only layers, starting with layer 1 (the base layer) 362a and then adding the upper read-only layer 2 362b and upper read-only layer 3 362c, one on top of the other, to form the container image 360. Each layer includes one or more files. When the layers are combined, a file in a higher layer may overwrite a file in a lower layer if the higher layer file updates a file in the lower layer.

Figure 3C:
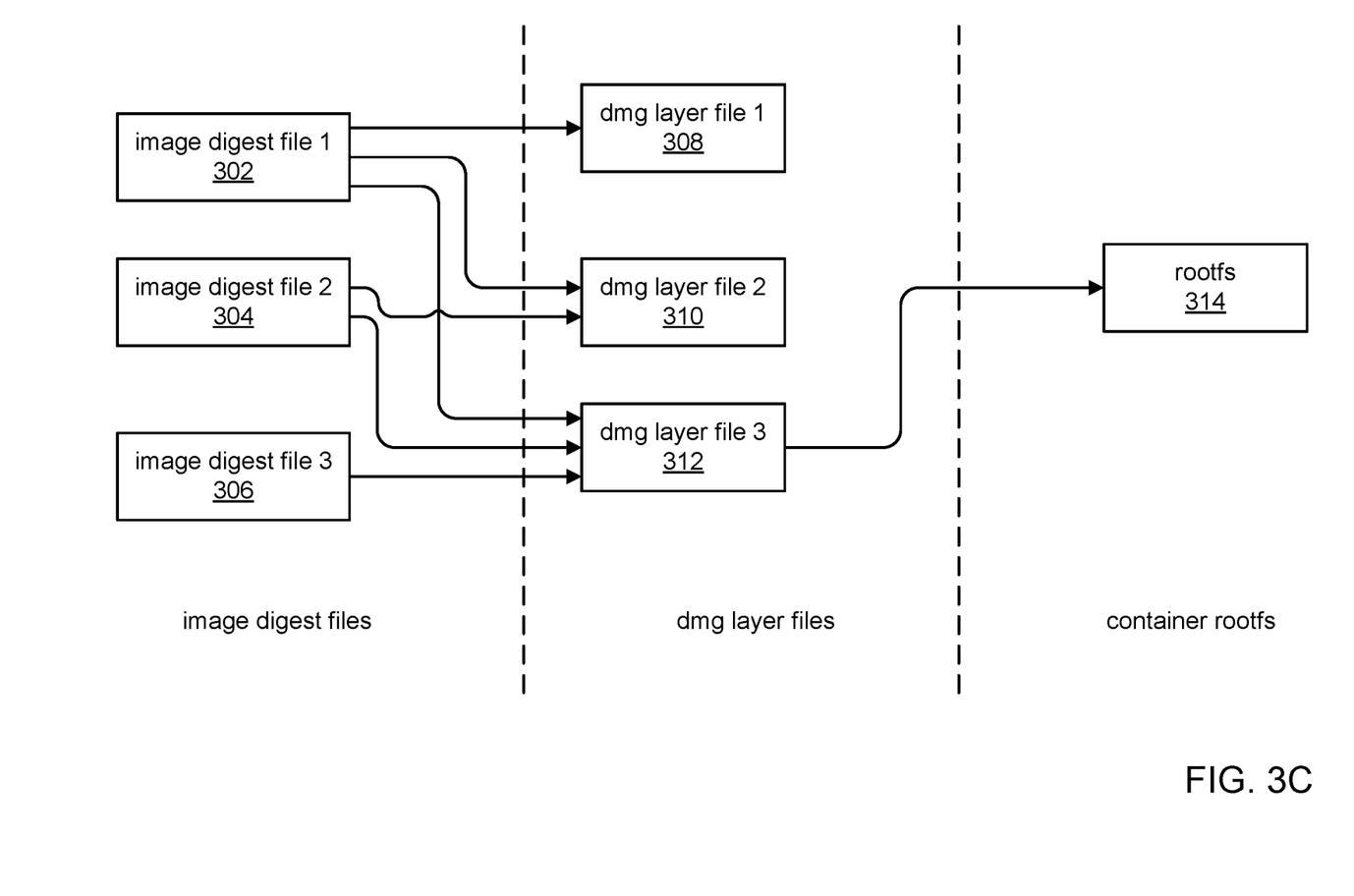
FIG. 3C depicts the construction of a container image, according to embodiments.

FIG. 3C depicts the construction of a container image. Three dmg layer files are depicted in the figure. The first dmg layer file is dmg layer file 1 308 and comprises (e.g., files of) image digest file 1 302, which is the base layer of the container image. Dmg layer file 2 310 comprises the combination of image digest file 2 304, which is a difference layer of the container image, and image digest file 1 302. Dmg layer file 3 312 comprises the combination of image digest file 1 302, image digest file 2 304, and image digest file 3 306 (another difference layer of the container image), which is then presented as a unified file system (rootfs) 314 to the container.

Using conventional techniques without a union mount, creating layer 3 may be a relatively inefficient process. For example, first, the image digest files are downloaded. Next, layer 1 is created by mounting it to a host folder and copying digest 1 to layer 1. Layer 2 is created by duplicating layer 1 and adding the contents of digest 2 to form layer 2. Layer 3 is created by duplicating layer 2 and adding contents from digest 3 to form layer 3. Not only is copying required but also layer 2 contains redundant contents from digest 1, and layer 3 contains redundant contents from both digest 1 and digest 2. The redundancy causes the use of more disk space than if a union mount were available.

Therefore, it is desirable to use a union mount facility to avoid copying digests to improve the performance of the formation of the root file system for a container.

Figure 4:
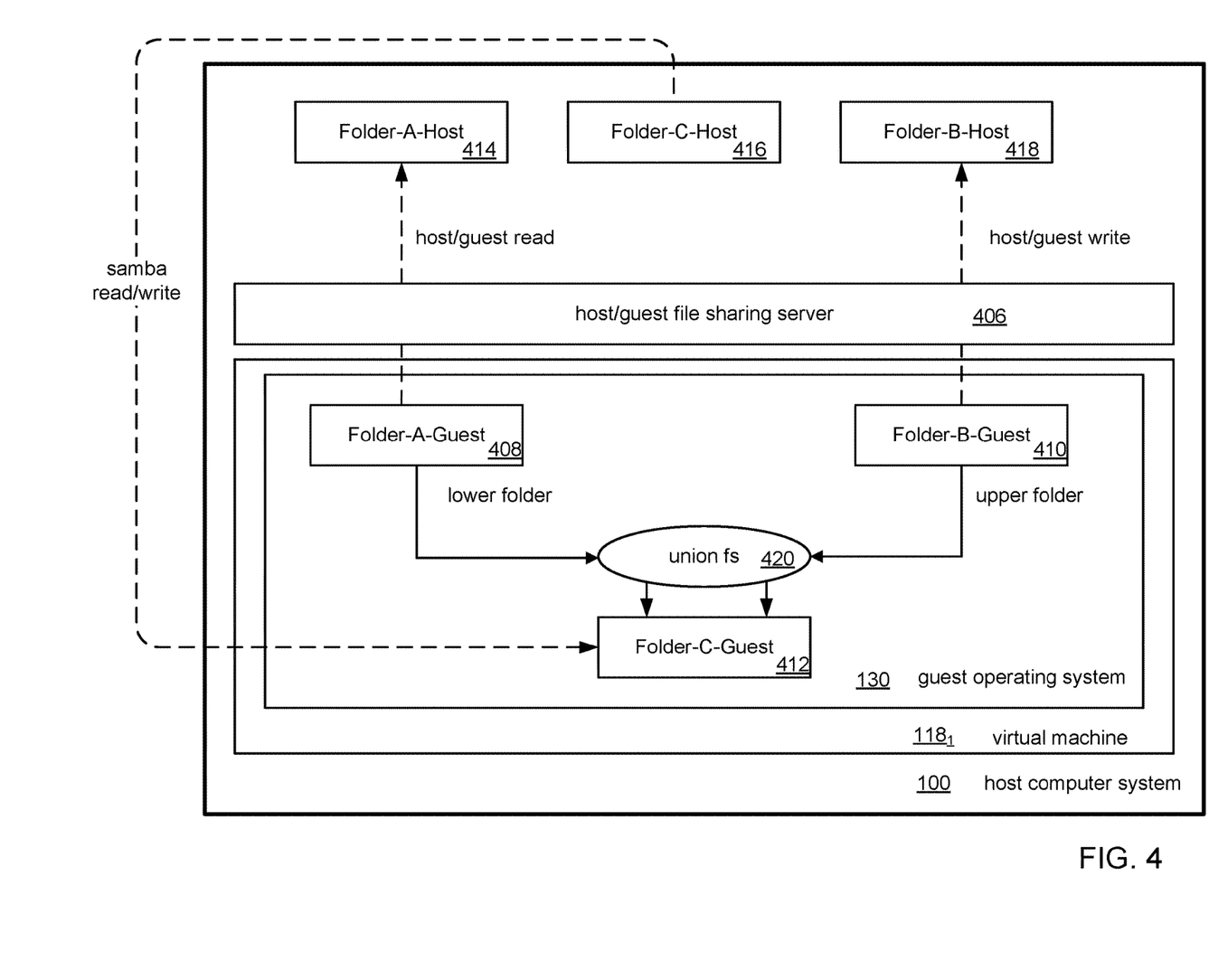
FIG. 4 depicts in more detail the host computer system, one of the virtual machines, and the various folders, according to embodiments.

FIG. 4 depicts in more detail the host computer system, one of the virtual machines, and the various folders, according to embodiments. The host computer system 100 contains the virtual machine $118_1$ running a guest operating system 130, such as the Linux® operating system, and a host/guest file-sharing server 406. In certain embodiments, the host/guest file-sharing server 406 is implemented with Samba daemons, which implement the Server Message Block (SMB) client-server protocol. Samba daemons are available for Linux® and Windows® operating systems. The virtual machine $118_1$ includes a Folder-A-Guest 408, a Folder-B-Guest 410, and a Folder-C guest 412. Folder-A-Guest 408 is a shared version of the Folder-A-Host 414, and Folder-B-Guest 410 is a shared version of the Folder-B-Host 418, while Folder-C-Host 416 is a shared version of Folder-C-Guest 412. Each of Folder-A-Host 414, Folder-B-Host 418, and Folder-C-Host 416 are folders in the host operating system of the host computer system 100. In certain embodiments, host computer system 100 acts as a Samba client, and the virtual machine $118_1$ runs a Samba server. In this case, Folder-C-Host 416 is obtained as a shared folder from Folder-C-Guest 412. Sharing of Folder-A-Host 414 and Folder-B-Host 418 requires sharing in the reverse direction from the sharing of Folder-C. In one embodiment, the reverse sharing is also implemented by a Samba Server on the host computer system 100, with the Samba client being the virtual machine $118_1$.

The guest operating system 130 of the virtual machine $118_1$ depicted in FIG. 4 further includes a union file system 420 with a union mount function. The union mount function of a union mount file system is capable of combining multiple different underlying mount points into one, resulting in a single directory structure that contains underlying files and sub-directories from all sources. File systems, such as 9 pfs, aufs, and OverlayFS, have the union mount function and are available in the Linux® operating system.

Figure 5:
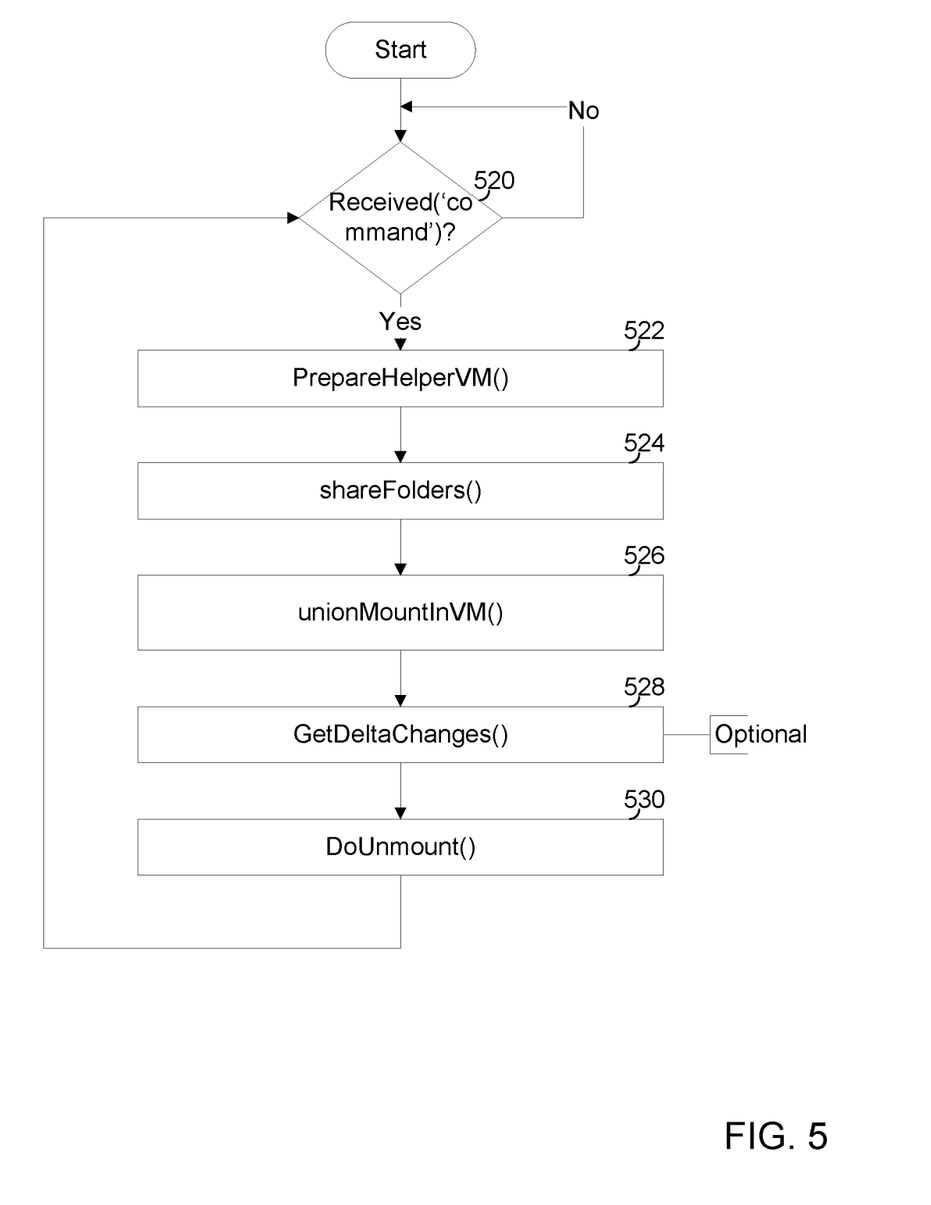
FIG. 5 depicts a flow of operations for performing a union mount in a virtual machine, according to embodiments.

FIG. 5 depicts a flow of operations for performing a union mount in a virtual machine, according to embodiments. A command is used to start the flow of operations. In one embodiment, the command is vfs -o lowerdir=/lower,upperdir=/upper,workdir=/work/merged, where lowerdir is a read-only folder on the host, upperdir is a writable folder on the host, and /merged is the target folder. Any modifications to the merged folder are written back to the upperdir folder. In certain embodiments, the vfs command does not automatically exit. Accordingly, in certain embodiments, a separate process or tool may be used to automatically cause the vfs command to exit, such as after the flow of operations in FIG. 5 completes.

Upon receiving the command to perform the operations in step 520, the flow prepares a helper VM in step 522. In step 524, the flow shares the folders to be combined between the host operating system of the host computer system 100 and the guest operating system 130 in the VM 118$_1$. The sharing channel between the VM 118$_1$ and the host computer system 100 can be hgfs or 9 pfs or any other host/guest sharing channel. In step 526, the flow performs the union mount of the shared folders. In one embodiment, a command, such as mount −t aufs −o br=/mnt/hgfs/Folder-B-Guest:/mnt/hgfs/Folder-A-Guest none ~/Folder-C-Guest performs the union mount operation. In step 528, which is optional, the flow causes any changes to Folder-C-Host to appears in Folder-B-Host, and, in step 530, the flow performs an unmount operation to clean up the state of the system. Each of the steps in FIG. 5 is further described in reference to FIGS. 6-11.

Figure 6:
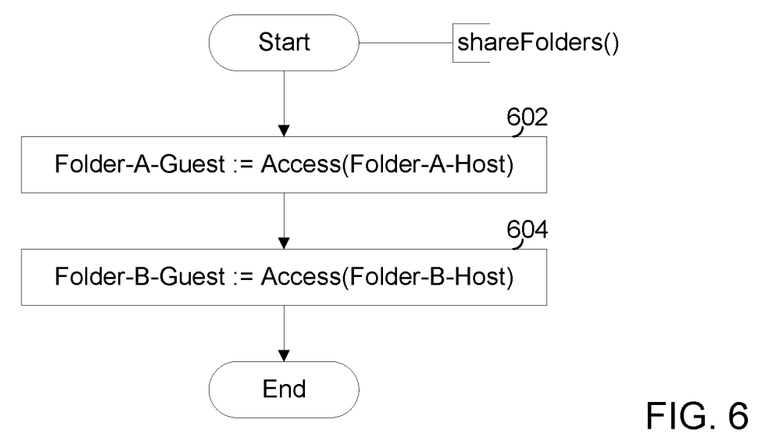
FIG. 6 depicts a flow of operations for sharing folders between the host and the guest, according to embodiments.

FIG. 6 depicts a flow of operations for sharing folders between the host computer system and the guest, according to embodiments. In step 602, Folder-A-Host 414 is shared via the host/guest file-sharing server 406 as Folder-A-Guest 408, and in step 604, Folder-B-Host 418 is shared via the host/guest file-sharing server 406 as Folder-B-Guest 410.

Figure 7:
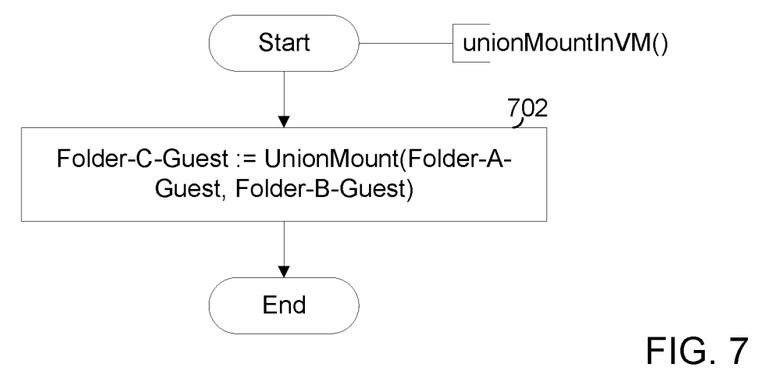
FIG. 7 depicts a flow of operations for performing a union mount of two folders in the virtual machine, according to embodiments.

FIG. 7 depicts a flow of operations for performing a union mount of two folders in the virtual machine, according to embodiments. In step 702, the guest operating system 130 performs the union mount of Folder-A-Guest 408 and Folder-B-Guest 410 to create Folder-C-Guest 412, which is shared via the host/guest file-sharing server 406 as Folder-C-Host 416. In certain embodiments, the Folder-C-Host 416 is accessed by a Samba client with a Samba server in the VM providing the Folder-C-Guest 412 to be shared. Folder-C-Host 416 is accessible on a host computer system 100 running Windows as the guest operating system 130 by the command mklink /d Folder-C-Host \\[HelperVM's IP]\workspace and on a host computer system 100 running MAC OS as the guest operating system 130 by the command mount_smbfs \\[HelperVM's IP]\workspace Folder-C-Host.

Figure 8:
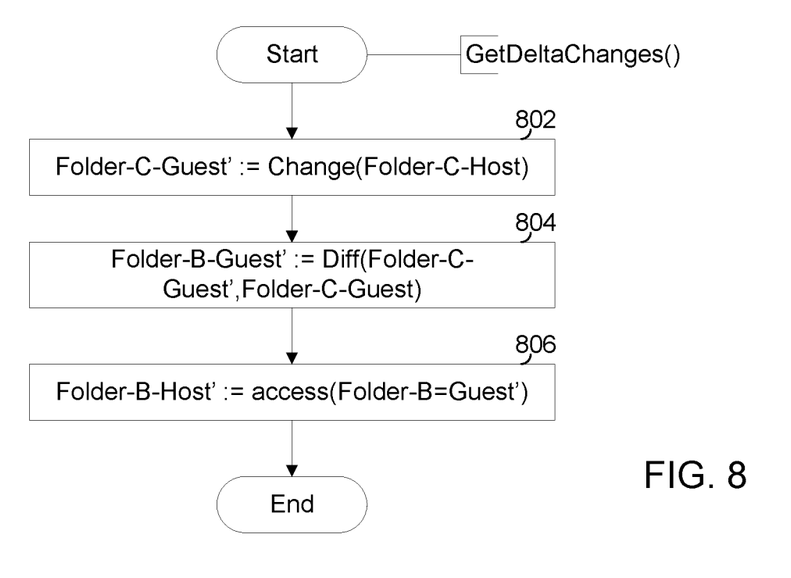
FIG. 8 depicts a flow of operations for reflecting changes to a host folder into a guest folder, according to embodiments.

FIG. 8 depicts a flow of operations for reflecting changes to a host folder into a guest folder, according to embodiments. In step 802, the flow obtains changes to Folder-C-Host 416 as Folder-C-Guest', where the prime indicates that Folder-C-Guest has been changed. In step 804, the flow generates the differences between Folder-C-Guest' and Folder-C-Guest 412 via the union mount operation of the union mount file system. In step 806, the flow reflects changes via the host/guest file sharing server 406 into the Folder-B-Guest' to Folder-B-Host', which now contains the changes.

Figure 9:
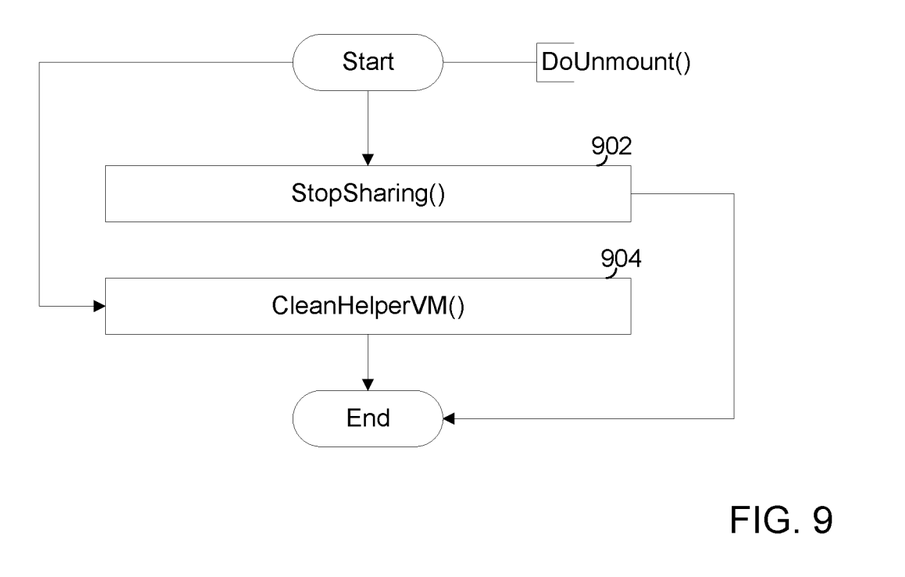
FIG. 9 depicts a flow of operations for performing an unmount operation, according to embodiments.

FIG. 9 depicts a flow of operations for performing a DoUnmount operation, according to embodiments. In step 902, the flow performs a StopSharing function, and in step 904 performs a cleanHelperVM function. The StopSharing function disables the sharing of folders from host to guest. The CleanHelperVM shuts down the helper VM. The flow can perform either step 902 or stop 904 or both steps to perform the DoUnmount operation.

Figure 10:
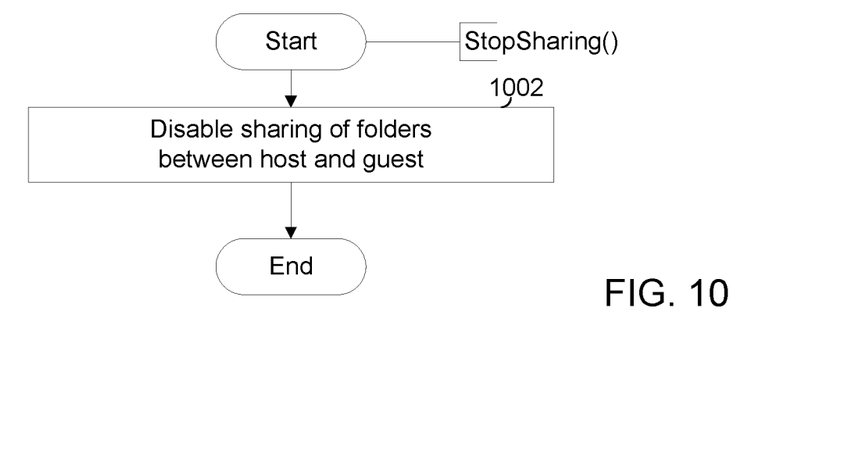
FIG. 10 depicts a flow of operations for performing the StopSharing function, according to embodiments.

FIG. 10 depicts a flow of operations for performing the StopSharing function, according to embodiments. The StopSharing function in step 1002 disables sharing in the host/guest file-sharing server. This step guarantees that Folder-A-Host 414 has no changes, that Folder-B-Host 418 has any changes that were made, and that Folder-C-Host 416 is empty, thereby leaving any changes only in Folder-B-Host 418.

Figure 11:
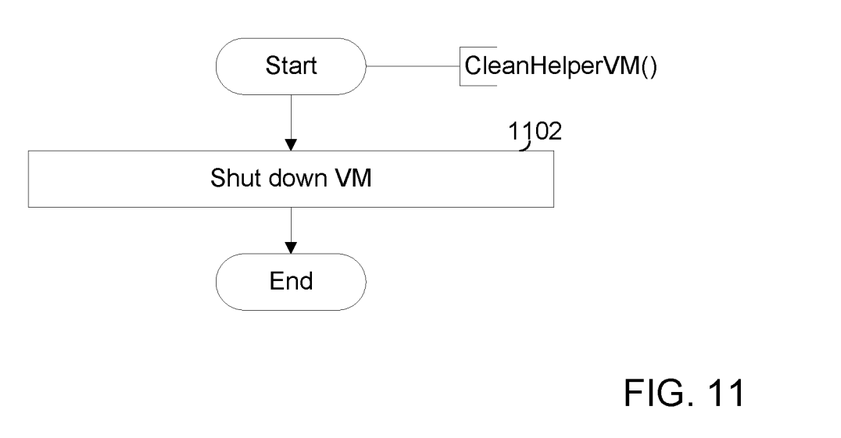
FIG. 11 depicts a flow of operations for performing a CleanHelperVM function, according to embodiments.

FIG. 11 depicts a flow of operations for performing a CleanHelperVM function, according to embodiments. In step 1102, the helper VM 118$_1$ is shut down. This step guarantees that Folder-A-Host 414 has no changes, that Folder-B-Host 418 has any changes that were made, and that Folder-C-Host 416 is empty, thereby leaving any changes only in Folder-B-Host 418.

The combination of the helper VM running an operating system that supports a union mount, such as Linux, and a file sharing service both running on the host computer system provides a high-performance folder combining system that can be used when forming a file system for a container as well as other applications.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations, including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data, which can thereafter be input to a computer system—computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation unless explicitly stated in the claims.

Virtualization systems, in accordance with the various embodiments, may be implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments, as described above, involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained only to use a defined amount of resources such as CPU, memory, and I/O. The term "virtualized computing instance" as used herein is meant to encompass both VMs and OS-less containers.

Variations, modifications, additions, and improvements are possible, regardless of the degree of virtualization. The virtualization software can therefore include components of a host, console, or guest operating system that performs virtualization functions. Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

The invention claimed is:

1. A method of performing a union mount of two folders, the method comprising:
   running a virtual machine on a hypervisor executing on a host operating system of a computing device, wherein the host operating system lacks a union mount capability;
   sharing a first folder and a second folder on the host operating system with a guest operating system of the virtual machine that has a union mount capability, such that a shared first folder and a shared second folder corresponding to the first folder and the second folder, respectively, appear to be present on the guest operating system of the virtual machine;
   performing in the guest operating system of the virtual machine a union mount of the shared first folder and the shared second folder to form a union mount folder;
   reverse-sharing the union mount folder on the guest operating system with the host operating system, such that a shared union mount folder corresponding to the union mount folder appears to be present on the host operating system, wherein the first folder is a read-only folder and the second folder is a writable folder, and write operations to the shared union mount folder are reflected in the second folder and not in the first folder; and
   upon completion of said reverse-sharing the union mount folder with the host operating system, shutting down the virtual machine, thereby disabling sharing of the first folder with the shared first folder and the second folder with the shared second folder.

2. The method of claim 1, further comprising:
   receiving changes to the shared union mount folder;
   providing the changes to the union mount folder based on receiving the changes to the shared union mount folder;
   providing the changes to the shared second folder based on providing the changes to the union mount folder; and
   providing the changes to the second folder based on providing the changes to the shared second folder.

3. The method of claim 1,
   wherein sharing the first folder and the second folder comprises the host operating system running a first file-sharing server and the virtual machine running a first file-sharing client, and
   wherein reverse-sharing the union mount folder comprises the virtual machine running a second file-sharing server and the host operating system running a second file-sharing client.

4. The method of claim 3, wherein the first file-sharing server and the second file-sharing server are a same application that is capable of implementing a client-server networking protocol on the host operating system and the guest operating system.

5. A computer system comprising:
   at least one processor; and
   a memory coupled to the at least one processor, the memory and the at least one processor being configured to:
      run a virtual machine on a host operating system of a computing device, wherein the host operating system lacks a union mount capability;
      share a first folder and a second folder on the host operating system with a guest operating system of the virtual machine that has a union mount capability, such that a shared first folder and a shared second folder corresponding to the first folder and the second folder, respectively, appear to be present on the guest operating system of the virtual machine;

perform in the guest operating system of the virtual machine a union mount of the shared first folder and the shared second folder to form a union mount folder;

reverse-share the union mount folder on the guest operating system with the host operating system, such that a shared union mount folder corresponding to the union mount folder appears to be present on the host operating system, wherein the first folder is a read-only folder and the second folder is a writable folder, and write operations to the shared union mount folder are reflected in the second folder and not in the first folder; and upon completion of reverse-sharing of the union mount folder with the host operating system, shut down the virtual machine, thereby disabling sharing of the first folder with the shared first folder and the second folder with the shared second folder.

6. The computer system of claim 5, wherein the memory and the processor are further configured to:

receive changes to the shared union mount folder;

provide the changes to the union mount folder based on receiving the changes to the shared union mount folder;

provide the changes to the shared second folder based on providing the changes to the union mount folder; and provide the changes to the second folder based on providing the changes to the shared second folder.

7. The computer system of claim 5, wherein sharing the first folder and the second folder comprises the host operating system running a first file-sharing server and the virtual machine running a first file-sharing client; and wherein reverse-sharing the union mount folder comprises the virtual machine running a second file-sharing server and the host operating system running a second file-sharing client.

8. The computer system of claim 7, wherein the first file-sharing server and the second file-sharing server are a same application that is capable of implementing a client-server networking protocol on the host operating system and the guest operating system.

9. A non-transient computer-readable medium containing instructions executable in a computer system, where the instructions when executed in the computer system cause the computer system to carry out a method of performing a union mount of two folders, the method comprising:

running a virtual machine on a hypervisor executing on a host operating system of the computer system, wherein the host operating system lacks a union mount capability;

sharing a first folder and a second folder on the host operating system with a guest operating system of the virtual machine that has a union mount capability, such that a shared first folder and a shared second folder corresponding to the first folder and the second folder, respectively, appear to be present on the guest operating system of the virtual machine;

performing in the guest operating system of the virtual machine a union mount of the shared first folder and the shared second folder to form a union mount folder;

reverse-sharing the union mount folder on the guest operating system with the host operating system, such that a shared union mount folder corresponding to the union mount folder appears to be present on the host operating system, wherein the first folder is a read-only folder and the second folder is a writable folder, and write operations to the shared union mount folder are reflected in the second folder and not in the first folder; and upon completion of said reverse-sharing the union mount folder with the host operating system, shutting down the virtual machine, thereby disabling sharing of the first folder with the shared first folder and the second folder with the shared second folder.

10. The non-transient computer-readable medium of claim 9, wherein the method further comprises:

receiving changes to the shared union mount folder;

providing the changes to the union mount folder based on receiving the changes to the shared union mount folder;

providing the changes to the shared second folder based on providing the changes to the union mount folder; and providing the changes to the second folder based on providing the changes to the shared second folder.

11. The non-transient computer-readable medium of claim 9, wherein sharing the first folder and the second folder comprises the host operating system running a first file-sharing server and the virtual machine running a first file-sharing client, and wherein reverse-sharing the union mount folder comprises the virtual machine running a second file-sharing server and the host operating system running a second file-sharing client.

12. The non-transient computer-readable medium of claim 11, wherein the first file-sharing server and the second file-sharing server are a same application that is capable of implementing a client-server networking protocol on the host operating system and the guest operating system.

* * * * *